United States Patent
Yan et al.

(10) Patent No.: US 10,522,176 B1
(45) Date of Patent: Dec. 31, 2019

(54) HEAT-ASSISTED MAGNETIC RECORDING (HAMR) READ/WRITE HEAD WITH REVERSED READ HEAD AND WRITE HEAD

(71) Applicant: Western Digital Technologies, Inc., San Jose, CA (US)

(72) Inventors: Wentao Yan, Fremont, CA (US); Neil David Knutson, Fremont, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/276,734

(22) Filed: Feb. 15, 2019

(51) Int. Cl.
*G11B 5/48* (2006.01)
*G11B 5/31* (2006.01)
*G11B 5/00* (2006.01)

(52) U.S. Cl.
CPC ............ *G11B 5/4866* (2013.01); *G11B 5/314* (2013.01); *G11B 2005/0021* (2013.01)

(58) Field of Classification Search
CPC .................. G11B 5/4866; G11B 5/314; G11B 2005/0021
See application file for complete search history.

(56) References Cited

U.S. PATENT DOCUMENTS

| | | | |
|---|---|---|---|
| 7,679,862 B2 | 3/2010 | Nakamoto et al. | |
| 8,897,104 B1 * | 11/2014 | Yan | G11B 5/314 369/112.27 |
| 9,842,618 B1 * | 12/2017 | Hutchinson | G11B 5/607 |
| 2011/0026377 A1 * | 2/2011 | Shimazawa | G11B 5/314 369/13.24 |
| 2011/0242697 A1 * | 10/2011 | Mori | G11B 5/314 360/59 |
| 2015/0162040 A1 * | 6/2015 | Rea | G11B 5/6041 360/75 |

* cited by examiner

*Primary Examiner* — Brian E Miller
(74) *Attorney, Agent, or Firm* — Thomas R. Berthold

(57) ABSTRACT

A heat-assisted magnetic recording (HAMR) disk drive read/write head has the write head located adjacent the trailing surface of the gas-bearing slider with the read head located adjacent the write head, which is the reversed location from conventional read/write heads. This results in reduced write head protrusion during writing which allows for a reduced minimum fly-height for the slider. For a HAMR read/write head that uses a heater to protrude the read head closer to the disk during reading, the reversed location allows for better heater efficiency and thus reduced heater power.

8 Claims, 4 Drawing Sheets

HEAT-ASSISTED MAGNETIC RECORDING (HAMR) READ/WRITE HEAD WITH REVERSED READ HEAD AND WRITE HEAD

TECHNICAL FIELD

This invention relates generally to a heat-assisted magnetic recording (HAMR) disk drive, in which data are written while the magnetic recording layer on the disk is at an elevated temperature, and more specifically to an improved HAMR read/write head.

BACKGROUND

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-$K_u$ magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature. The recorded data is then read back at ambient temperature by a conventional magnetoresistive read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

In a typical HAMR write head, light from a laser diode is coupled to a waveguide that guides the light to a near-field transducer (NFT) (also known as a plasmonic antenna). A "near-field" transducer refers to "near-field optics", wherein the passage of light is through an element with subwavelength features and the light is coupled to a second element, such as a substrate like a magnetic recording layer, located a subwavelength distance from the first element. A head carrier or slider supports the NFT and the write head, with the NFT and write pole having ends located substantially at the surface of the slider that faces the recording layer. A protective slider overcoat is formed on the recording-layer-facing surface over the NFT and write pole ends and serves as the gas-bearing surface (GBS) of the slider. The slider also supports the read head and rides above the disk surface on a cushion of gas, which is typically air or helium.

HAMR disk drives with thermal fly-height control (TFC) of the read/write heads have been proposed. One type of TFC uses an electrically-resistive heater located on the slider near the read head or write head. When current is applied to the heater, Joule heating of the heater causes the head to expand and thus move closer to the disk surface. The head can be adjusted to different heights, depending on whether the drive is reading or writing. Also, the heater can maintain the head at the optimal fly-height (FH) even in the presence of the above-described factors, which would otherwise cause changes in the FH.

FIG. 1 is a top view of a heat-assisted magnetic recording (HAMR) disk drive 100 according to the prior art. In FIG. 1, the HAMR disk drive 100 is depicted with a disk 200 with a continuous magnetic recording layer 31 with concentric circular data tracks 118. Only a portion of a few representative tracks 118 near the inner and outer diameters of disk 200 are shown.

The drive 100 has a housing or base 112 that supports an actuator 130 and a drive motor (not shown) for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 200 and enables it to "pitch" and "roll" on the gas-bearing generated by the disk 200 as it rotates in the direction of arrow 20. The slider 120 supports the HAMR read/write head (not shown), which includes a magnetoresistive read head, an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR read/write head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

In the following drawings, the X direction denotes a direction perpendicular to the gas-bearing surface (GBS) of the slider, the Y direction denotes a track width or cross-track direction, and the Z direction denotes an along-the-track direction. FIG. 2 is a schematic cross-sectional view illustrating a configuration example of a HAMR read/write head according to the prior art, which is also capable of functioning as the HAMR read/write head in embodiments of this invention. In FIG. 2, the disk 200 is depicted as a conventional disk with the HAMR recording layer 31 being a continuous non-patterned magnetic recording layer of magnetizable material with magnetized regions or "bits" 34. The bits 34 are physically adjacent to one another and the boundaries of adjacent bits are referred to as magnetic transitions 37. The bits are recorded in individual data sectors. The recording layer 31 is typically formed of a high-anisotropy ($K_u$) substantially chemically-ordered FePt alloy (or CoPt alloy) with perpendicular magnetic anisotropy. The disk includes an overcoat 36, typically formed of amorphous diamond-like carbon (DLC), and a liquid lubricant layer 38, typically a bonded perfluoropolyether (PFPE).

The gas-bearing slider 120 is supported by suspension 135. The slider 120 has a recording-layer-facing surface 122, a trailing surface 121 substantially orthogonal to surface 122 for deposition of the layers making up the read and write heads, and a trailing edge 125. The surface 121 and edge 125 are referred to as "trailing" because they are the last portions of the slider that are exposed to the bits 34 as the disk 200 moves in the direction of arrow 20 past the slider 120. An overcoat 124 is deposited on surface 122. The overcoat 124 is typically a DLC overcoat with a thickness in the range of about 10 to 30 Å and whose outer surface forms the GBS of the slider 120. An optional adhesion undercoat (not shown), such as a 1 to 5 Å silicon (Si) or a silicon nitride (SiNx) film, may be deposited on the surface 122 before deposition of the overcoat 124. The recording-layer-facing surface shall mean the surface of the slider 120 that is covered with a thin protective overcoat, the actual outer surface of the slider if there is no overcoat, or the outer surface of the overcoat. The phrase "substantially at the recording-layer-facing surface" shall mean actually at the surface or slightly recessed from the surface. The phrase "substantially at the GB S" shall mean actually at the outermost surface or slightly recessed from the outermost surface.

A magnetoresistive (MR) read head is formed on the slider trailing surface 121 and includes a MR sensor 60 located between magnetically permeable read head shields S1 and S2. The spacing between S1 and S2 along the Z-axis at the GBS is called the read gap (RG). An electrically-resistive heater 62 is also formed on the trailing surface 121 and is controlled by a thermal fly-height control (TFC) device in the drive's electronics. When current is applied to the heater 62, the surrounding slider material is caused to expand in response to the heat, which causes a bulge in the RG toward the disk 200. Particularly during read operations, the heater 62 causes the RG and thus the read sensor 60 to be closer to the disk 200 to increase the strength of the readback signal from the recording medium.

A magnetic write head 50 is also formed on trailing surface 121, but is located at the slider trailing edge 125. A recording magnetic field is generated by the write head 50 made up of a helical coil with coil sections 56a and 56b, a main magnetic pole 53 for transmitting flux generated by the coil, a write pole 55 with end or tip 52, and a return pole 54. The main pole 53 and return pole 54 are connected by pole section 57. The main pole 53, return pole 54 and section 57 are formed of ferromagnetic alloys like one or more of Co, Fe and Ni. Write pole 55 is typically formed of a high-moment material like CoFe. A magnetic field generated by the coil 56a, 56b is transmitted through the main pole 53 and write pole 55 to the write pole tip 52 located near an optical near-field transducer (NFT) 74. The write head 50 is typically capable of operating at different clock rates so as to be able to write data at different frequencies. The NFT 74, also known as a plasmonic antenna, typically uses a low-loss metal (e.g., Au, Ag, Al or Cu) shaped in such a way to concentrate surface charge motion at a tip located at the slider GBS when light from the waveguide 73 is incident. Oscillating tip charge creates an intense near-field pattern, heating the recording layer 31. The metal structure of the NFT can create resonant charge motion (surface plasmons) to further increase intensity and heating of the recording layer. At the moment of recording, the recording layer 31 of disk 200 is heated by the optical near-field generated by the NFT 74 and, at the same time, a region or "bit" 34 is magnetized and thus written onto the recording layer 31 by applying a recording magnetic field generated by the write pole tip 52.

A semiconductor laser 90 is mounted to the top surface of slider 120. An optical waveguide 73 for guiding light from laser 90 to the NFT 74 is formed inside the slider 120. The laser 90 is typically capable of operating at different power levels. Materials that ensure a refractive index of the waveguide 73 core material to be greater than a refractive index of the cladding material may be used for the waveguide 73. The waveguide 73 that delivers light to NFT 74 is preferably a single-mode waveguide.

An insulating material like alumina, depicted as material 80 in FIG. 2, is formed on the trailing surface 121 and generally surrounds the elements making up the read head, write head 50, optical waveguide 73 and NFT 74.

During writing the slider region near the write pole tip protrudes, primarily as a result of heat from the write coil, the laser and the NFT. If this write pole tip protrusion (PTP) is too great, the write pole tip can contact the disk. To address the problem of write PTP, the disk drive is designed to have a minimum fly-height (FH), i.e., the minimum distance between the lowest point on the GBS and the disk when there is no protrusion. Thus the design minimum FH must take into account the amount of write PTP. High write PTP can require an undesirable high minimum design FH. The problem of write PTP is exacerbated because the write pole is near the trailing edge of the slider. This is shown in FIG. 3, which shows the minimum FH and the effect of write PTP. The write PTP is depicted as item 90 and the read gap (RG) protrusion is depicted as item 91. The write pole tip is a distance L from the trailing surface in the Z or along-track direction, where L can be around 8-9 microns. If L were much shorter, the effect of write PTP would be less pronounced. Also, referring again to FIG. 2, this distance L means that there is a relatively large amount of insulating material 80 between the write pole tip 52 and trailing surface 121, so that there is less heat transmission from the write head to the slider material.

An additional problem with the slider depicted in FIG. 2 is that relatively high heater power must be delivered to heater 62 to produce the correct amount of read gap (RG) protrusion during reading.

U.S. Pat. No. 7,679,862 B2, assigned to the same assignee as this application, describes a conventional non-HAMR perpendicular magnetic recording read/write head where the location of the read head and write head on the slider are reversed from their conventional location. The primary motivation for this structure is to locate an auxiliary pole 31, shown in FIG. 5 of the patent, adjacent to the slider trailing surface so as to minimize flux leakage from the auxiliary pole to the disk. This is only possible because the head uses a "pancake" coil wherein all coil sections lie in the same plane. In embodiments of this invention, the main pole 253 in FIG. 4, which corresponds to the auxiliary pole 31 of the patent, cannot be located adjacent the trailing surface because the coil is a helical coil. The patent also suggests that more uniform heat dissipation occurs because all of the sections of the pancake coil are nearer to the slider trailing surface. This is a feature that cannot occur with a helical coil. The head described in the patent is not a HAMR read/write head and does not include a heater for RG protrusion, so does not address issues of laser heating and heater efficiency.

SUMMARY

In a HAMR disk drive, the write pole tip protrudes during writing as a result of heat from the write coil, the laser and the NFT. The disk drive is designed to have a minimum fly-height (FH), i.e., the minimum distance between the lowest point on the slider and the disk when there is no protrusion. Thus the design minimum FH must take into account the amount of write pole tip protrusion (PTP). High write PTP can require an undesirable high minimum design FH. An additional problem in a HAMR read/write head with TFC for the read head is that high heater power is required to cause the desired amount of read head protrusion.

In embodiments of the HAMR read/write head according to this invention the locations of the read head and write head on the slider are reversed from their conventional location. The write head is thus further from the disk so the protruded write head is less likely to contact the disk. Additionally the reversed location on the slider increases heat dissipation from the write head, which reduces the amount of protrusion. The reversed location of the read head allows the heater to be better insulated, so there is less heat loss, which allows the heater to be more efficient and thus require less power.

For a fuller understanding of the nature and advantages of the present invention, reference should be made to the following detailed description taken together with the accompanying figures.

DETAILED DESCRIPTION

Figure 3:
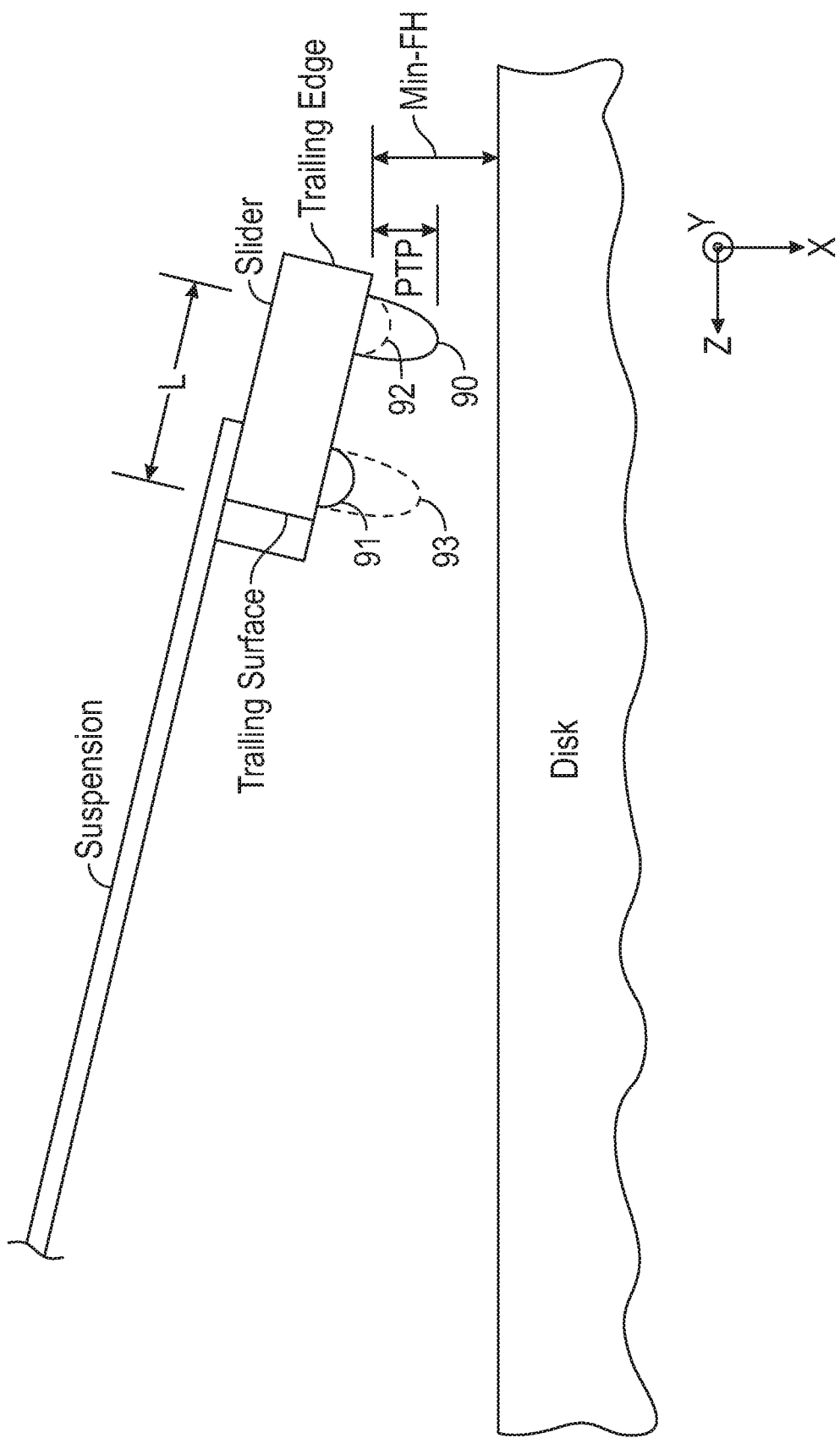
FIG. 3 is a schematic comparing the location of the protruded read and write heads on a slider relative to the disk for the prior art HAMR read/write head and the reversed HAMR read/write head according to an embodiment of the invention.

Embodiments of this invention reverse the location of the read head and write head on the slider. This reduces the effect of write PTP because the distance L is reduced, which moves the write pole tip further from the disk, as can be seen from FIG. 3 if the write pole tip were to be located where the RG is. In this reversed embodiment the write PTP is depicted with dashed lines as item 93 and the read gap (RG) protrusion is depicted with dashed lines as item 92. Additionally, the write pole tip is now closer to the slider trailing surface so there is less insulating material between the write pole tip and the trailing surface, so more heat can be dissipated by the slider material. Because the heater associated with the read head is now near the slider trailing edge there is more insulating material between it and the trailing surface. There is thus less heat dissipation from the heater and thus the heater is more efficient, i.e., less heat is required per distance of RG protrusion.

Figure 4:
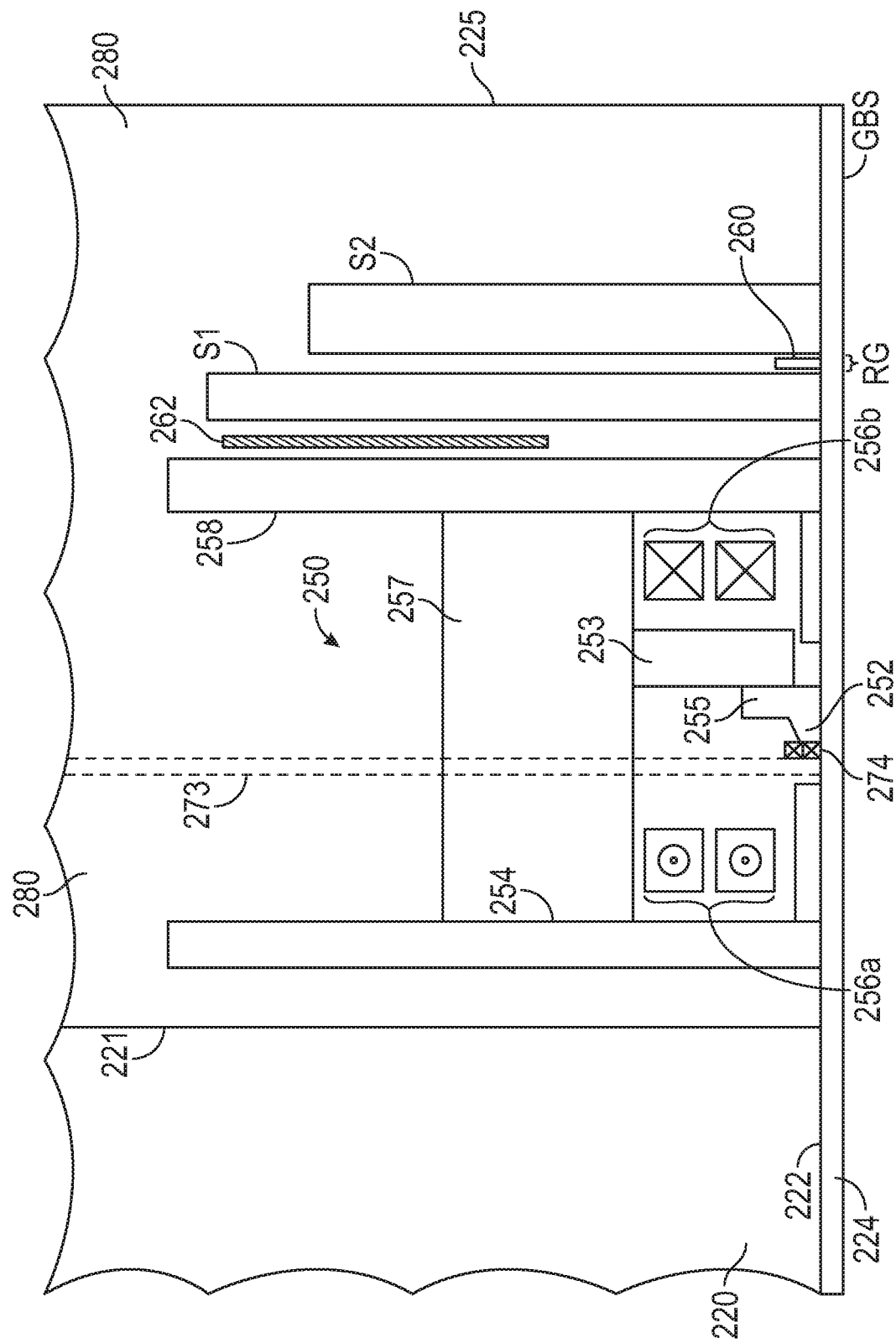
FIG. 4 is a sectional view, not drawn to scale because of the difficulty in showing the very small features, of a portion of a gas-bearing slider for use in a HAMR disk drive according to an embodiment of the invention.

FIG. 4 depicts a sectional view, not drawn to scale because of the difficulty in showing the very small features, of a portion of a gas-bearing slider for use in a HAMR disk drive according to an embodiment of the invention. The HAMR read/write head of FIG. 4 includes substantially the same operative elements as described for the HAMR read/write head depicted in FIG. 2, with the primary difference being that the locations of the write head and read head on the slider are reversed. The slider 220 has a recording-layer-facing surface 222, a trailing surface 221 substantially orthogonal to surface 222 for deposition of the layers making up the read and write heads, and a trailing edge 225. An overcoat 224 is deposited on surface 222. The write head 250 includes, in sequential order from trailing surface 221, first return pole 254, first helical coil section 256a, optical waveguide 273 coupled to NFT 274, write pole 255 with pole tip 252, main pole 253, second helical coil section 256b, and second return pole 258. Pole section 257 connects return pole 254 with main pole 253. The read head includes read sensor 260 substantially at the GBS located between first read shield Si and second read shield S2. The spacing between Si and S2 at the GBS is the read gap (RG). A heater 262 is located between second return pole 258 and Si. Thus the read head is near the slider trailing edge 225, with the write head 250 being located between the slider trailing surface 221 and the read head. Insulating material like alumina, depicted as material 280 in FIG. 4, is formed on the trailing surface 221 and generally surrounds the elements making up the write head 250, optical waveguide 273, NFT 274 and the read head.

The heater 262 is primarily used to protrude the RG during reading, but may also be used during writing if it is necessary to increase the write PTP. This would typically be done at a lower heater power than used for reading. The heater 262 may alternatively be located between S2 and the slider trailing edge 225. The HAMR read/write head may optionally include a second heater associated with the write head 250. In that case the second heater may be located in the region above pole section 257, for example near second return pole 258.

Figure 1:
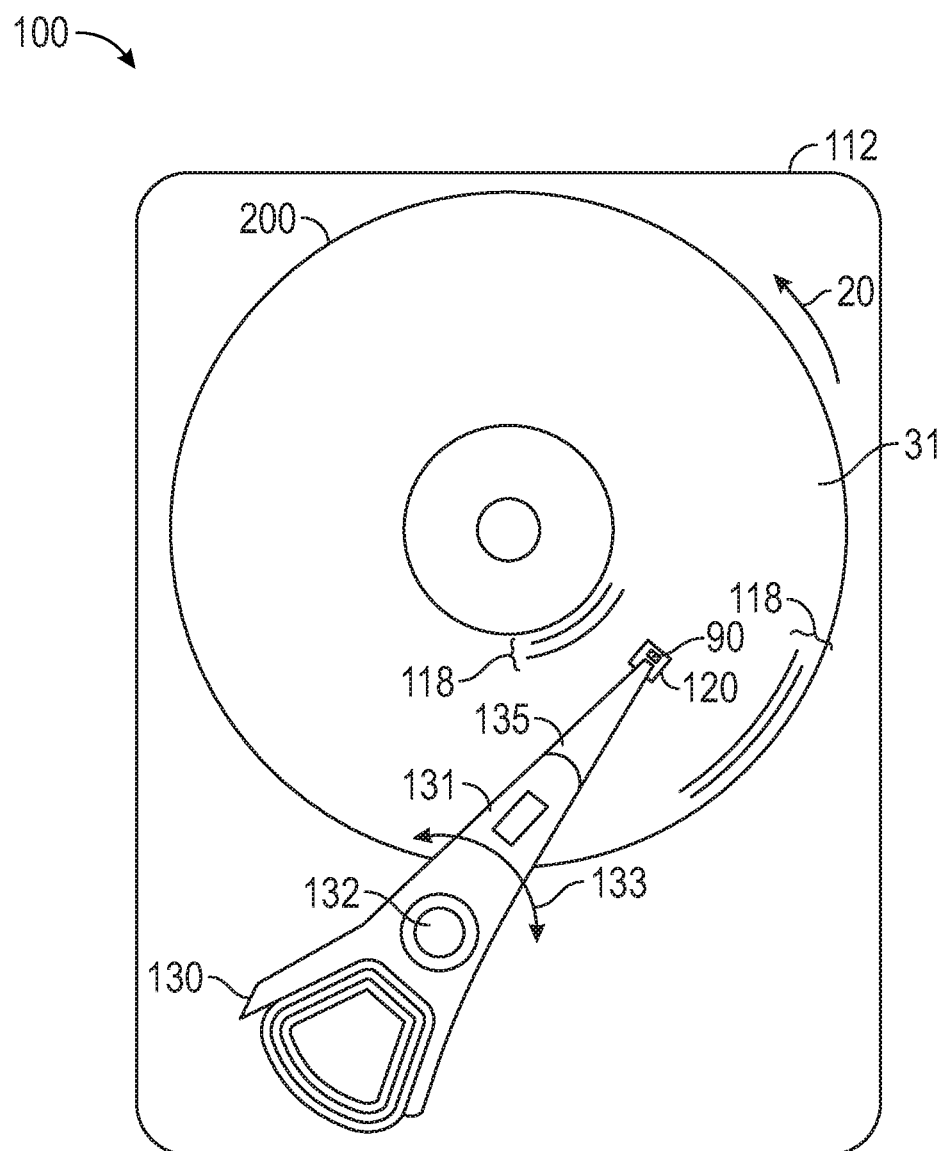
FIG. 1 is a top view of a heat-assisted magnetic recording (HAMR) disk drive according to the prior art.
Figure 2:
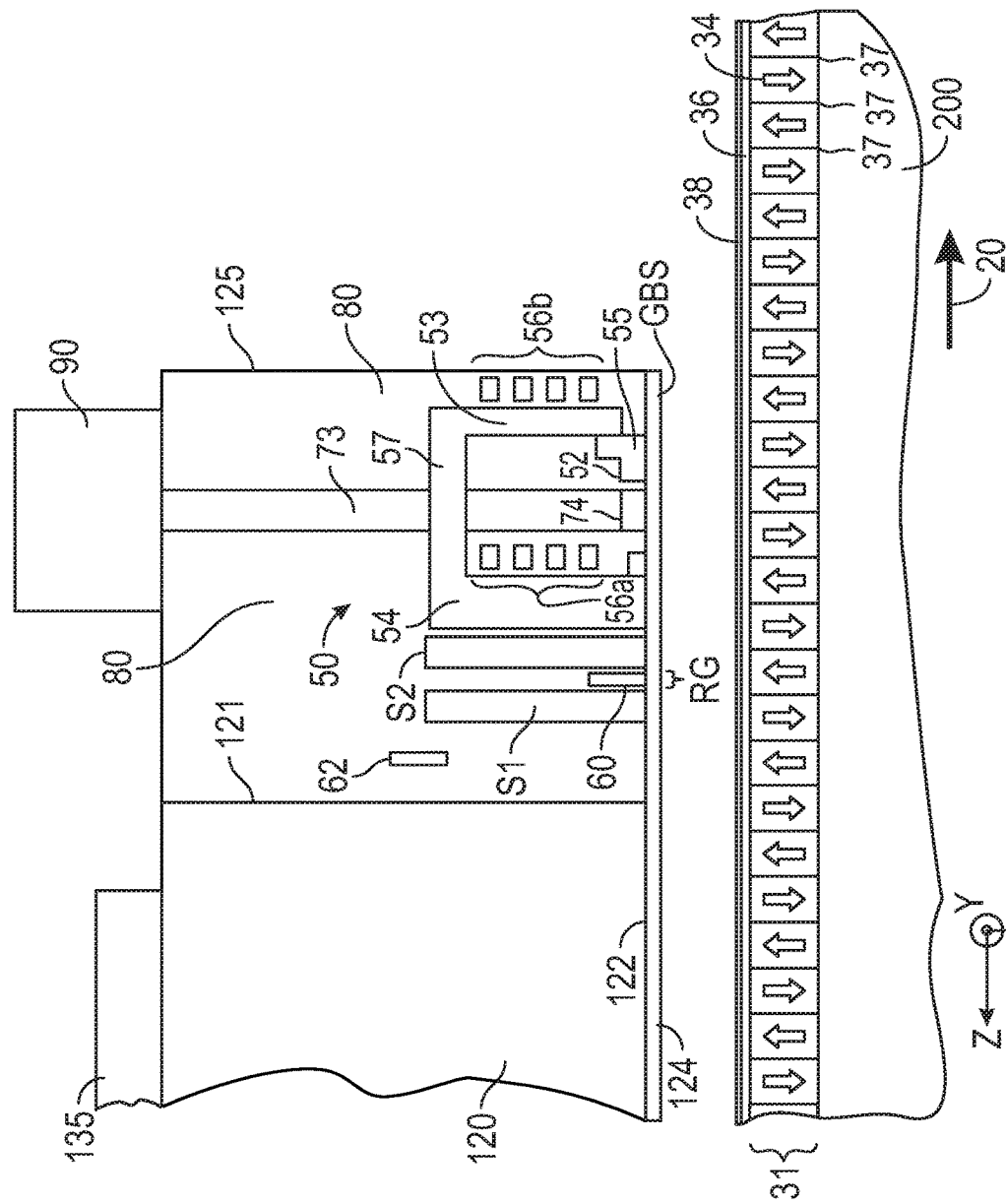
FIG. 2 is a sectional view, not drawn to scale because of the difficulty in showing the very small features, of a gas-bearing slider for use in HAMR disk drive and a portion of a HAMR disk according to the prior art.

The HAMR read/write head of FIG. 4 provides substantial improvements over the conventional HAMR read/write head of FIG. 2. Because the locations of the read head and write head are reversed, the RG is now nearer the slider trailing edge and thus closer to the disk, as can be seen from FIG. 3. This reduces the amount of RG protrusion needed during reading and thus reduces the required heater power. Also, since the heater is now further from the slider trailing surface it is better insulated so there is less heat dissipation. Computer modeling has demonstrated a 51% improvement in heater efficiency, i.e., the amount of RG protrusion per unit of heater power, and a resulting reduction in read sensor temperature by 32%. The reduction in read sensor temperature results in improved lifetime of the reader since it is known that high temperature cycling reduces sensor lifetime.

The write pole tip protrusion (PTP) during writing is substantially reduced because the write pole and NFT are closer to the slider trailing surface, which results in more heat dissipation. Computer modeling has demonstrated a 16% reduction in write PTP. The write pole tip is now further from the disk, as can be seen from FIG. 2. The result of both the reduction in write PTP and increased distance from the disk allows for a decrease in the design minimum FH.

In a conventional HAMR read/write head the fabrication of the optical waveguide and NFT requires high temperature annealing, which can damage the previously fabricated read sensor. In the reversed HAMR read/write head according to embodiments of this invention, the read sensor can be fabricated after the optical waveguide and NFT so there is no damage to the read sensor.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording (HAMR) read/write head for reading and writing data on a recording layer comprising:

a head carrier having a surface for facing a recording layer and a trailing edge substantially orthogonal to the recording-layer facing surface;

a write head on the head carrier, the write head comprising a write pole having a tip substantially at the recording-layer-facing surface, and a helical coil having first and second coil sections surrounding the write pole, the second coil section being between the trailing edge and the write pole;

an optical waveguide between the coil sections for receipt of laser radiation;

a near-field transducer (NFT) near the write pole for optical coupling with the waveguide, the NFT having an output end substantially at the recording-layer-facing surface;

a read head on the head carrier, the read head comprising first and second read shields and a magnetoresistive sensor between the read shields, wherein the read head is between the trailing edge and the write head; and a heater on the head carrier adjacent one of said read shields, wherein the read shield nearest the write head is the first read shield and wherein the heater is located between the write head and the first read shield.

2. A heat-assisted recording (HAMR) system comprising: the HAMR read/write head of claim 1;
a laser for directing light to the waveguide; and
a magnetic recording medium having a magnetic recording layer.

3. A heat-assisted magnetic recording (HAMR) read/write head for reading and writing data on a recording layer comprising:

a gas-bearing slider having a gas-bearing surface (GBS) for facing a recording layer and a trailing edge substantially orthogonal to the GBS;

a write head on the slider, the write head comprising a first return pole, a first helical coil section adjacent the first return pole, a write pole having a tip substantially at the GBS, a second helical coil section adjacent the write pole, wherein the write pole is between the two helical coil sections, a second return pole adjacent the second helical coil section, and a pole section connecting the first return pole and the write pole;

an optical waveguide between the first helical coil section and the write pole for receipt of laser radiation;

a near-field transducer (NFT) near the write pole for optical coupling with the waveguide, the NFT having an output end substantially at the GBS;

a read head on the slider, the read head comprising a first read shield adjacent the second return pole, a magnetoresistive sensor having an end substantially at the GBS, and a second read shield, the sensor being located between the first and second read shields, and wherein the read head is between the trailing edge and the write head; and an electrically-resistive heater on the slider adjacent one of said read shields.

4. The HAMR read/write head of claim 3 wherein the heater is located between the second return pole and the first read shield.

5. The HAMR read/write head of claim 3 wherein the heater is located between the trailing edge and the second read shield.

6. A heat-assisted recording (HAMR) disk drive comprising:
the HAMR read/write head of claim 3;
a laser for directing light to the waveguide; and
a magnetic recording disk having a magnetic recording layer.

7. A heat-assisted magnetic recording (HAMR) read/write head for reading and writing data on a recording layer comprising:

a head carrier having a surface for facing a recording layer and a trailing edge substantially orthogonal to the recording-layer facing surface;

a write head on the head carrier, the write head comprising a write pole having a tip substantially at the recording-layer-facing surface, and a helical coil having first and second coil sections surrounding the write pole, the second coil section being between the trailing edge and the write pole;

an optical waveguide between the coil sections for receipt of laser radiation;

a near-field transducer (NFT) near the write pole for optical coupling with the waveguide, the NFT having an output end substantially at the recording-layer-facing surface;

a read head on the head carrier, the read head comprising first and second read shields and a magnetoresistive sensor between the read shields, wherein the read head is between the trailing edge and the write head; and a heater on the head carrier, wherein the read shield nearest the write head is the first read shield and wherein the heater is located between the trailing edge and the second read shield.

8. A heat-assisted magnetic recording (HAMR) system comprising:
the HAMR read/write head of claim 7;
a laser for directing light to the waveguide; and
a magnetic recording medium having a magnetic recording layer.

* * * * *